(12) United States Patent
Lin

(10) Patent No.: US 6,971,656 B2
(45) Date of Patent: Dec. 6, 2005

(54) MOVABLE BOTTOM FRAME

(76) Inventor: Chun-Kai Lin, No. 179, Sec. 2, Yongping Rd., Taiping City, Taichung County 411 (TW)

( * ) Notice: Subject to any disclaimer, the term of this patent is extended or adjusted under 35 U.S.C. 154(b) by 0 days.

(21) Appl. No.: 10/739,064

(22) Filed: Dec. 19, 2003

(65) Prior Publication Data

US 2005/0134011 A1   Jun. 23, 2005

(51) Int. Cl.[7] ............................................... B62B 5/00
(52) U.S. Cl. ............................... 280/79.11; 280/43.13; 280/43.17; 414/458; 414/495
(58) Field of Search .................... 280/43.17, 43.13, 280/43.18, 43.19, 43.2, 79.11, 79.7, 79.2, 280/79.5; 414/458, 444, 476, 490, 495

(56) References Cited

U.S. PATENT DOCUMENTS

| | | | | |
|---|---|---|---|---|
| 3,845,933 A | * | 11/1974 | Heizer, Jr. ............... | 280/43.17 |
| 5,876,173 A | * | 3/1999 | English, Jr. .................. | 414/458 |
| 5,957,649 A | * | 9/1999 | English et al. .............. | 414/458 |
| 6,311,992 B1 | * | 11/2001 | Theising .................. | 280/79.11 |
| 6,715,979 B1 | * | 4/2004 | Theising et al. ............ | 414/458 |

* cited by examiner

*Primary Examiner*—Hau Phan
(74) *Attorney, Agent, or Firm*—Troxell Law Office, PLLC

(57) ABSTRACT

A movable bottom frame includes a frame body, two movable connecting rods and a locking rod. The frame body and the movable connecting rods are respectively provided with two casters and have their ends respectively and pivotally assembled with four support legs of a worktable. The locking rod is assembled between the two movable connecting rods. The frame body has a first pedal to be pedaled down to make the frame body and the movable connecting rods pivotally turned downward to let the casters stand on the ground and lift up the worktable. A second pedal positioned beside the first pedal can be pedaled down to disengage the locking rod from the locking hook, letting the worktable supported by its four support legs again. Thus the worktable can be stopped or moved slidably by pedaling.

3 Claims, 8 Drawing Sheets

MOVABLE BOTTOM FRAME

BACKGROUND OF THE INVENTION

1. Field of the Invention

This invention relates to a movable bottom frame, particularly to one pivotally assembled the lower portions of four stationary support legs of a worktable, able to be controlled by pedaling to take the place of the four support legs to support the worktable and make it slide about on the ground.

2. Description of the Prior Art

Generally, most medium-sized or small-sized processing machines, such as planers, sanders and the like, are respectively provided with four stationary support legs to maintain the height and support the weight of a worktable. When such a worktable needs to be transferred from one place to another, it has to be moved by manpower or by special carriers, taking too much time and labor in transfer of the worktable. In view of the above-mentioned defect, the worktable has its four legs respectively provided at the lower end with a caster with a brake to control the worktable to be stopped or moved slidably. Nevertheless, such casters are likely to be damaged after used for a period of time and have no excellent effect in braking, likely to cause to the worktable to influence the precision and quality of processing when the machine operates processing. Additionally, each caster is independently assembled on each leg of the worktable; therefore each caster has to be braked or released respectively, resulting in much inconvenience in use.

In the U.S. Pat. No. 5,976,173, No. 5,957,649 and No. 6,311,992, a worktable has its legs provided at the lower end with a support frame with casters, which can be shrunk inward and positioned at an upper position of the legs of the worktable and also can be controlled to stand on the ground to lift up the worktable and move it slidably by means of the casters.

However, the foresaid support frame is generally made of two separate frames combined together so it is complicated in structure and inconvenient in assembly, increasing producing and assembling cost.

SUMMARY OF THE INVENTION

The objective of the invention is to offer a movable bottom frame pivotally assembled with the lower portions of the stationary support legs of a worktable, able to be controlled by pedaling in due time to lift up and support the worktable to take the place of the stationary support legs to enable the worktable to slide about on the ground.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
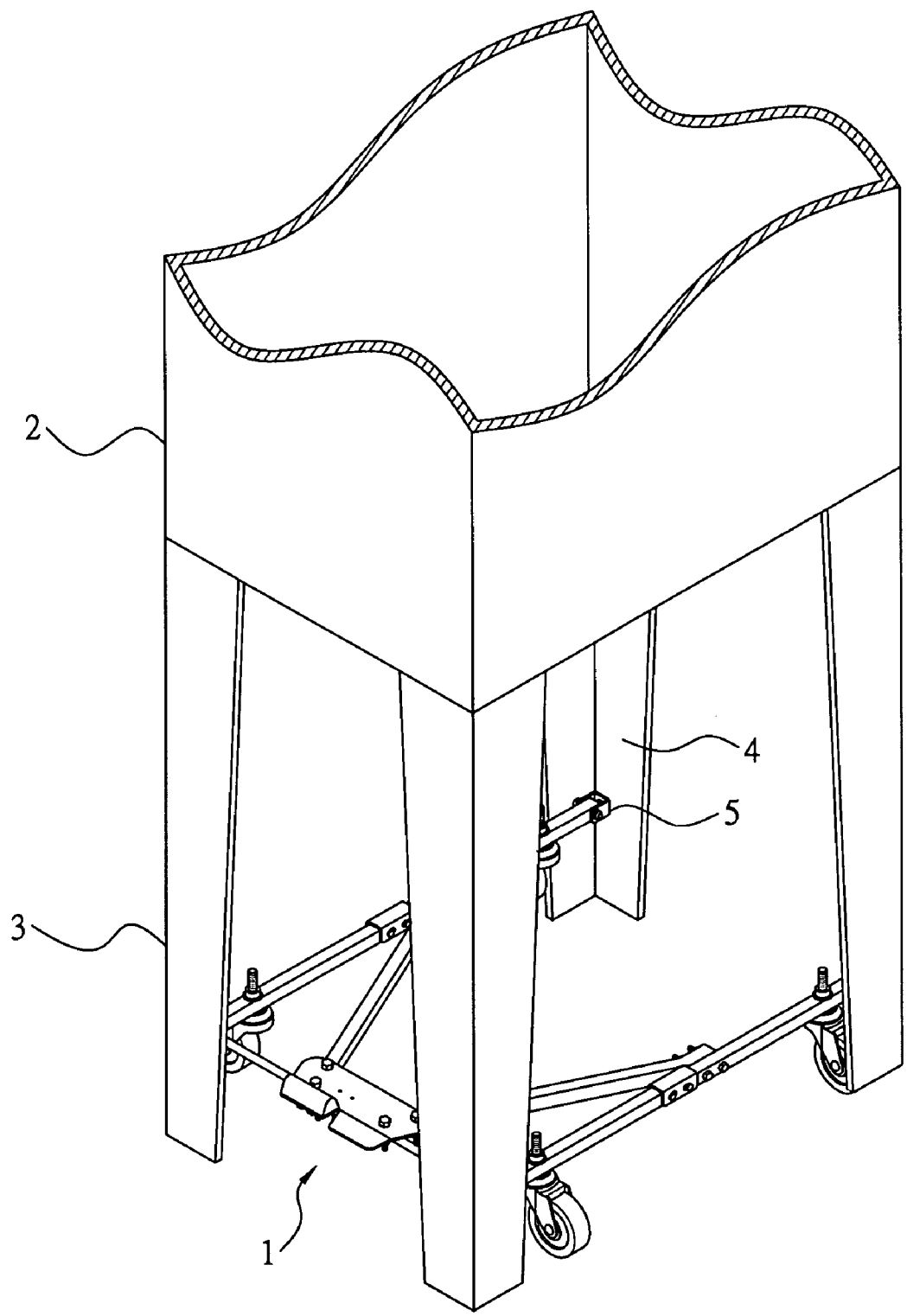
FIG. 1 is a perspective view of a movable bottom frame assembled with four legs of a worktable in the present invention.
Figure 2:
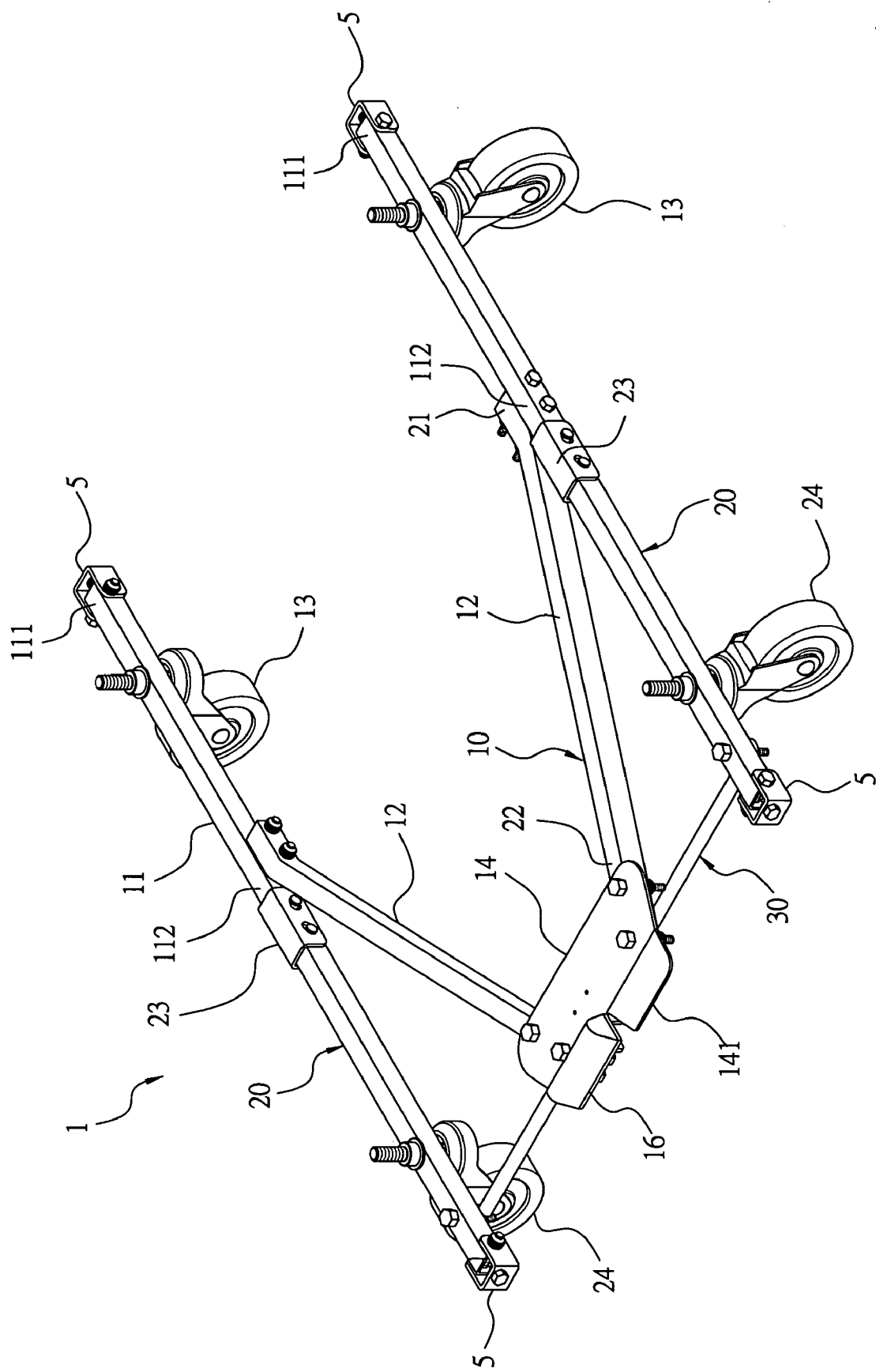
FIG. 2 is a perspective view of the movable bottom frame in the present invention.
Figure 3:
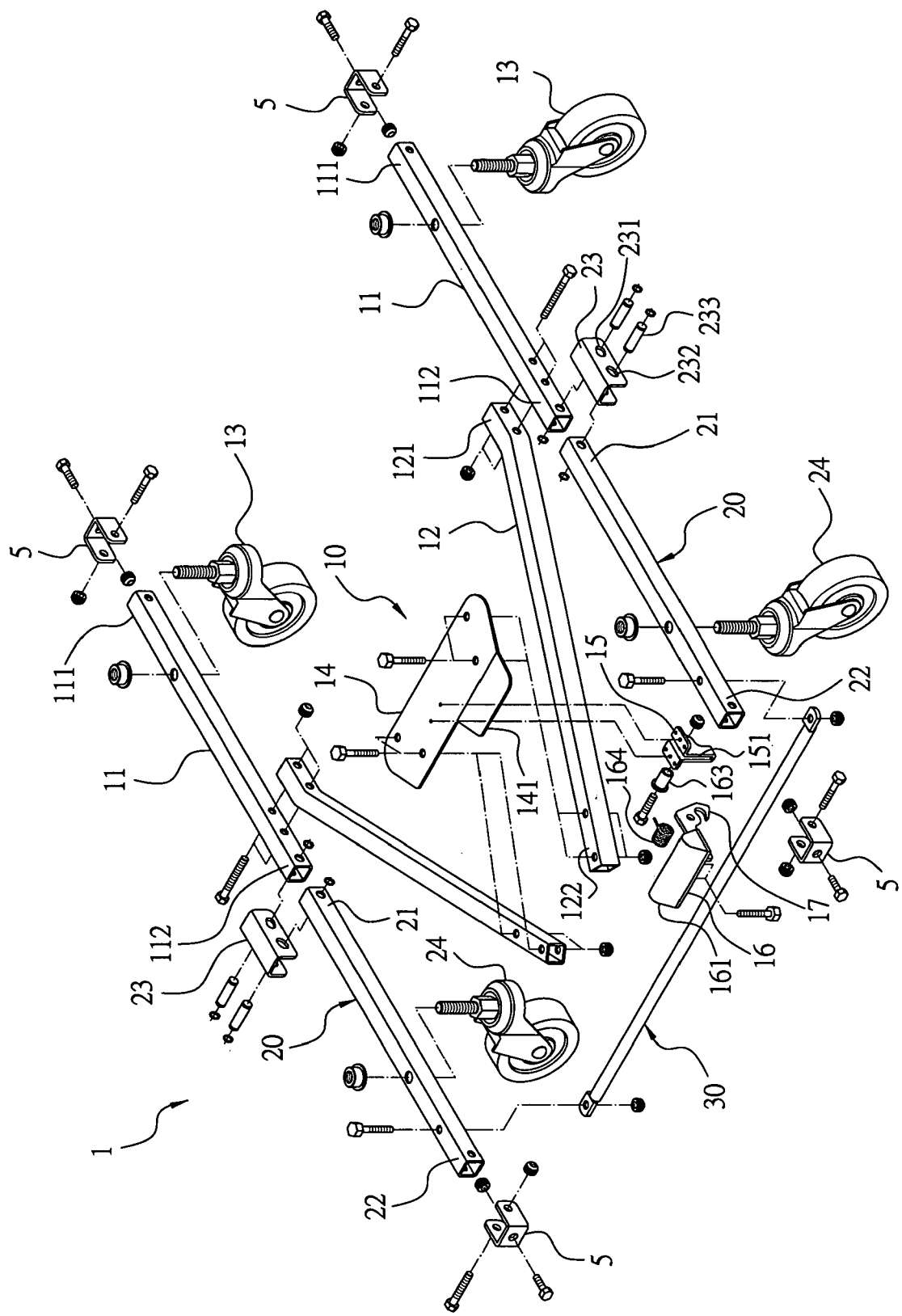
FIG. 3 is an exploded perspective view of the movable bottom frame in the present invention.

A preferred embodiment of a movable bottom frame 1 in the present invention, as shown in FIGS. 1, 2 and 3, is pivotally assembled on the lower inner portions of the four support legs 3 of a worktable 2. The four legs 3 of the worktable 2 are respectively formed with an L-shaped elongate bar having inner walls 4 for assembling the movable bottom frame thereon. The movable bottom frame 1 in the present invention includes a frame body 10, two movable connecting rods 20 and a locking rod 30 as main components combined together.

Figure 4:
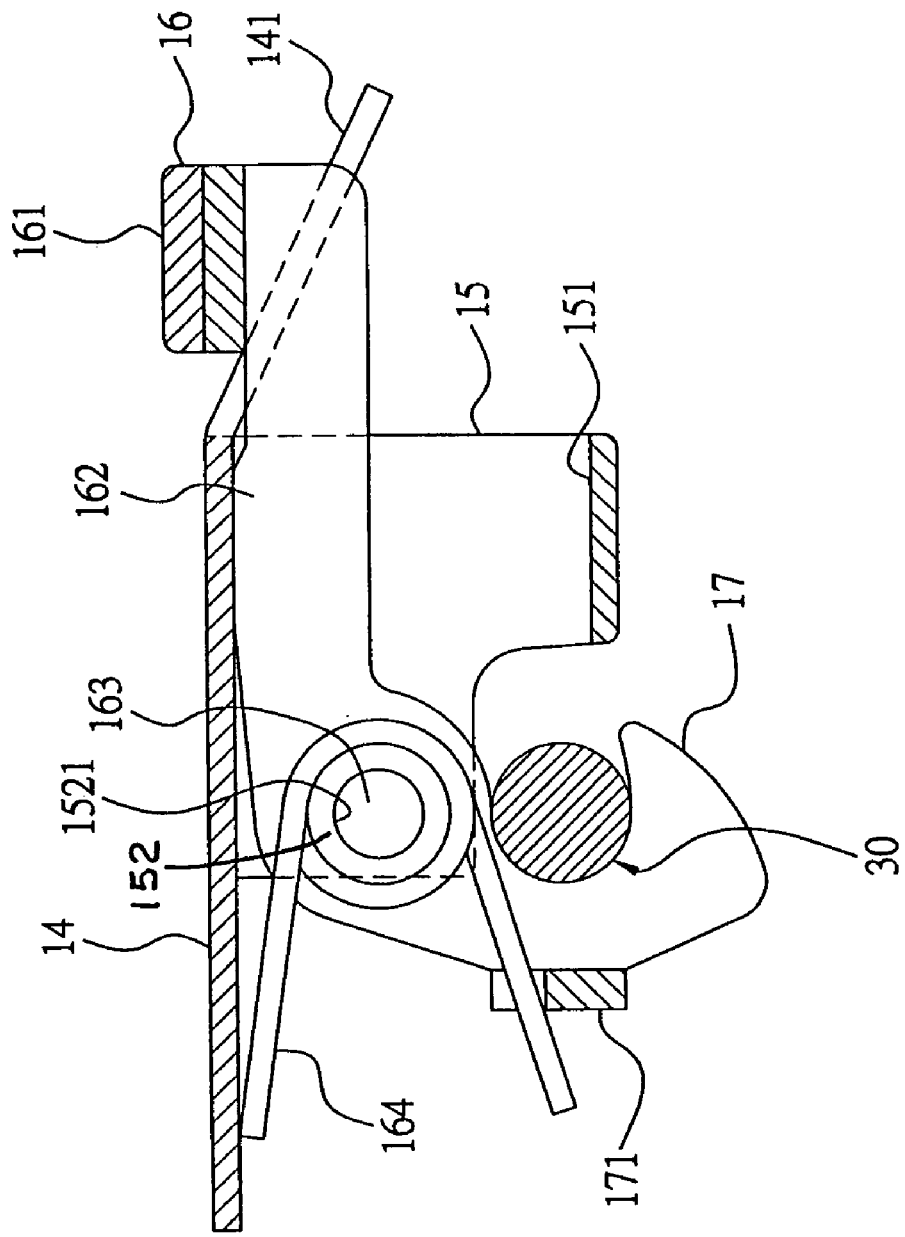
FIG. 4 is a side cross-sectional view of the pedaling and locking portions of the movable bottom frame in the present invention.

The frame body 10 consists of two side rods 11 and two oblique rods 12. Each side rod 11 has its rear free end 111 provided pivotally and lengthwise with a U-shaped pivotal lug 5 to be assembled on the support leg 3, with a caster 13 fixed under the rear free end 111 near the pivotal portion of the support leg 3. The two side rods 11 have the inner sides of their front free ends 112 respectively secured with the rear free ends 121 of the two oblique rods 12, which have their front free ends 122 extending inward obliquely. The two oblique rods 12, as shown in FIG. 4, have their front free ends 122 combined thereon with a rectangular first pedal 14 having a pedaling member 141 extending outward from one side of its front end. The first pedal 14 has a clasp base 15 fixed under the bottom beside the pedaling member 141 and having its front side formed with a U-shaped groove 151 and its rear side formed with a pivotal portion 152 with pivotal holes 1521. A second pedal 16 is partially and pivotally assembled on the clasp base 15 of the first pedal 14, having one end formed with a pedaling member 161 and the other end formed integral with a locking hook 17. The connecting portion 162 connecting the pedaling member 161 and the locking hook 17 is positioned in the U-shaped groove 151 of the clasp base 15 and pivotally fixed therein by a pivotal shaft 163 to let the pedaling member 161 and the locking hook 17 pivotally turned together. The locking hook 17 has one side provided with a spring engaging block 171 and the pivotal shaft 163 has its outer side fitted with a torsion spring 164, which has one end pushing against the bottom side of the first pedal 14 and the other end pushing against the topside of the spring engaging block 171 of the locking hook 17. Thus, the locking hook 17 of the second pedal 16 can always be kept in an elastically hooking condition by means of torsion spring 164 and the clasp base 15.

The two movable connecting rods 20 have their rear free ends 21 respectively connected pivotally with the front free ends 112 of the two side rods 11 of the frame body 10 by means of two U-shaped connector 23. Each connector 23 is formed with two parallel side plates 231 respectively having two sliding slots 232 slanting upward, with two pivots 233 respectively inserted through the two sliding slots 232 as well as the front free end of the side rod 11 and rear free end of the movable connecting rod 20 so as to enable the side rods 11 and the movable connecting rods 20 to slide relatively through the pivot 233 positioned in the sliding slots 232. Further, the two movable connecting rods 20 have their front free ends 22 respectively assembled pivotally with the U-shaped pivotal lug 5 of the other two support legs 3 of the worktable 2, with two casters 24 respectively fixed under the two movable connecting rods 20 near the front free end 22.

The locking rod 30 is firmly assembled between the two front free ends 22 of the two movable connecting rods 20 and positioned under the locking hook 17 of the frame body 10 to be clasped by the locking hook 17.

Figure 5:
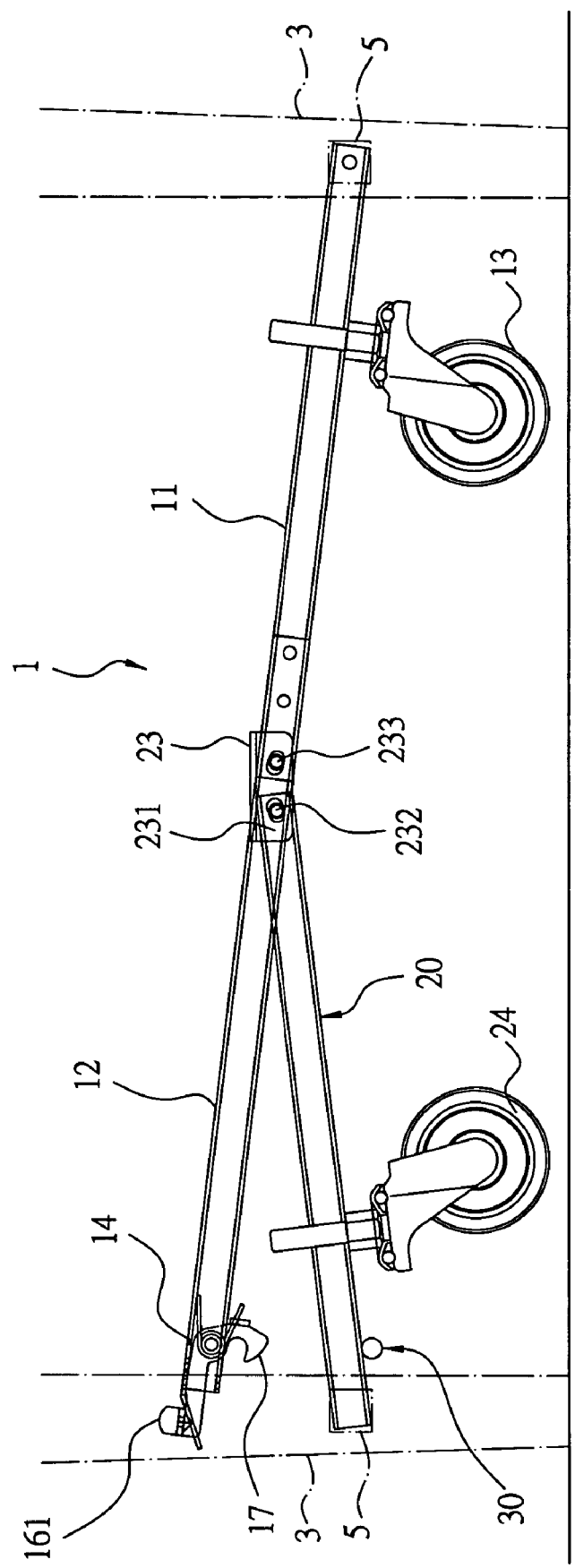
FIG. 5 is a side cross-sectional view of the movable bottom frame in the present invention.

As shown in FIG. 5, in a normal condition, the locking rod 30 is not clasped by the locking hook 17 of the frame body 10; therefore the casters 13, 24 under the frame body 10 and the movable connecting rods 20 are pressed by the weight of the worktable 2, and the frame body 10 and the movable connecting rods 20 are turned pivotally at their mutual pivotal joints and also at the pivotal joints between them and the four support legs 3 to let the worktable 2 completely supported by the four legs 3 standing on the ground. At this time, the pivotally connecting portions of the frame body 10 and the movable connecting rods 20 are moved upward and loosened.

Figure 6:
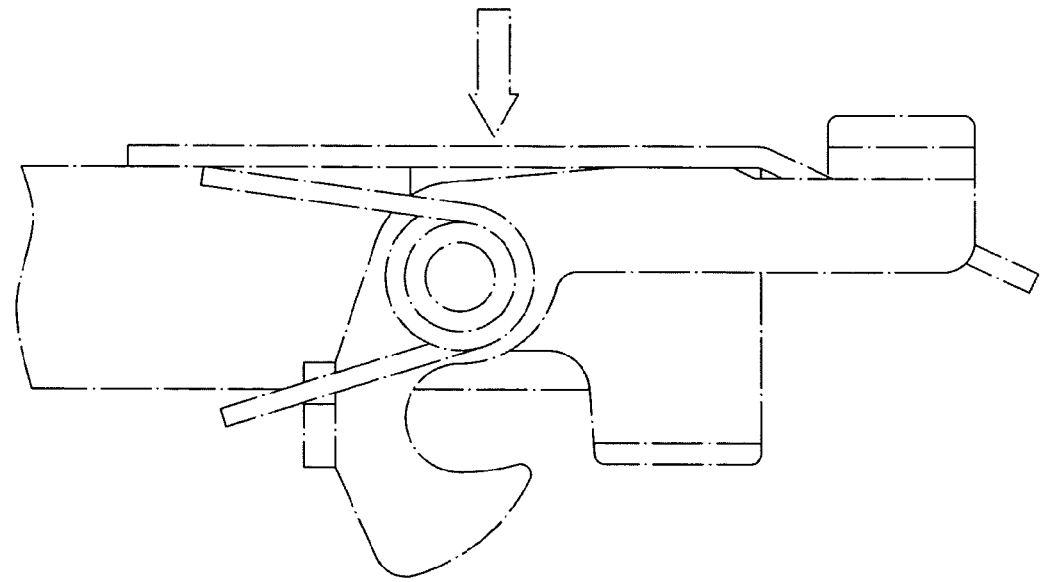
FIG. 6 a side cross-sectional view of the movable bottom frame in the present invention, showing a locking hook clasping a locking rod when a first pedal is pedaled down.
Figure 6:
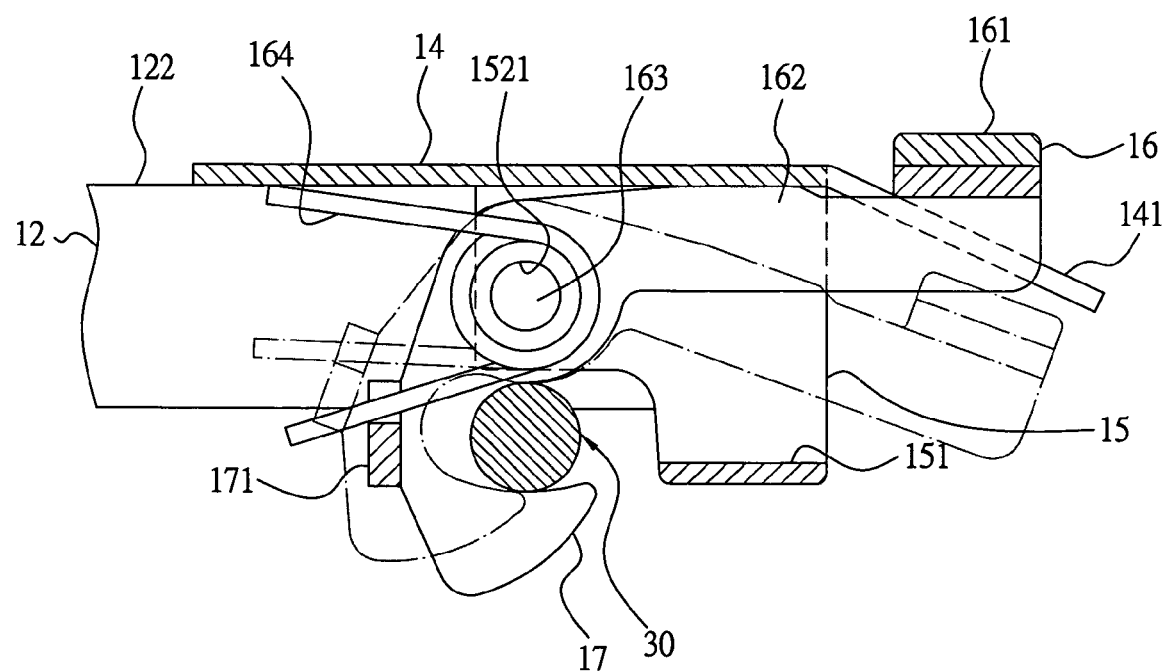
Figure 7:
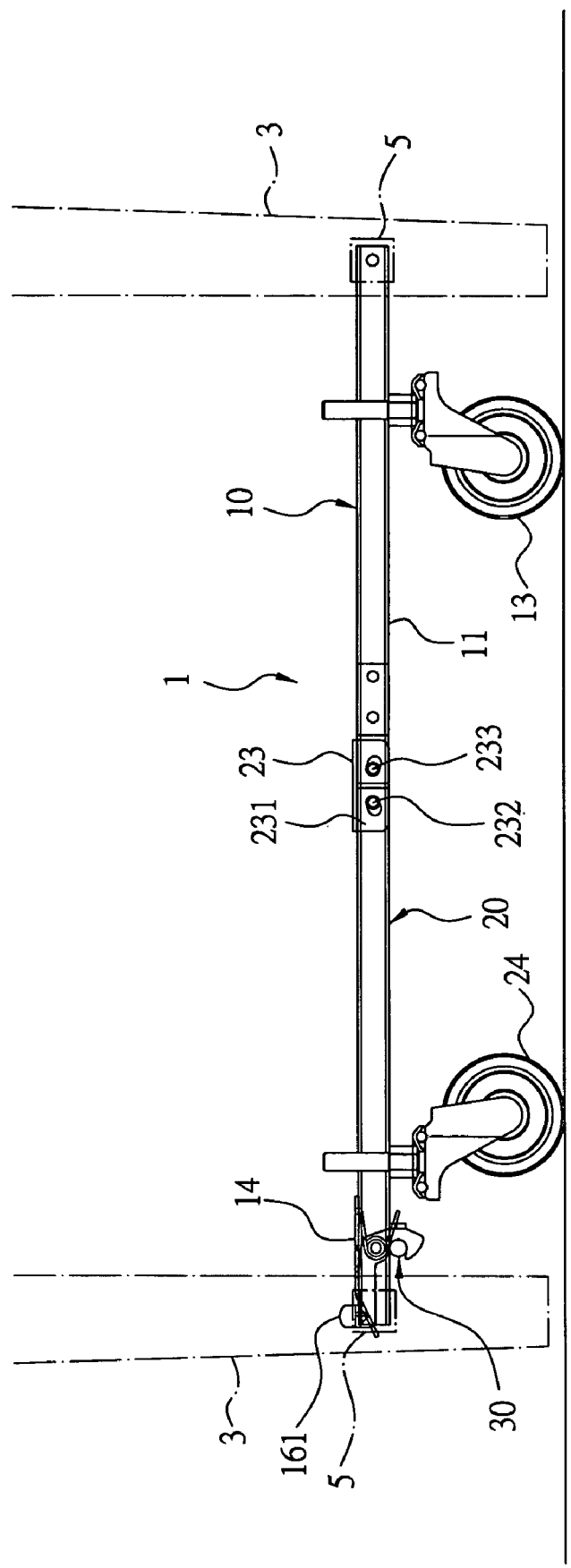
FIG. 7 is a cross-sectional view of the movable bottom frame in an unsupported condition in the present invention.

To enable the worktable 2 to slide on the ground, as shown in FIG. 6, pedal downward the pedaling member 141 of the first pedal 14 of the frame body 10 and the frame body 10, with the pivotal joints of its rear free ends 111 and the support legs 3 of the worktable 2 acting as rotating fulcrums, will be pivotally turned downward and the locking hook 17 under the first pedal 14 will be moved toward the locking rod 30, and simultaneously the casters 13, 24 under the frame body 10 and the two movable connecting rods 20 will be pressed downward to stand on the ground and lift up the worktable 2. When the locking hook 17 is pressed to contact with the locking rod 30, it will overcome the torsional resilience of the torsion spring 164 and pivotally be turned open a little to clasp the locking rod 30 therein in cooperation with the locking base 15. At this time, the casters 13, 24 under the frame body 10 and the movable connecting rods 20 will synchronously lift up the worktable 2 together with its four support legs 3 from the ground to let the weight of the worktable 2 fully imposed on the casters 13, 24 and enable the worktable 2 to slide freely, as shown in FIG. 7.

Figure 8:
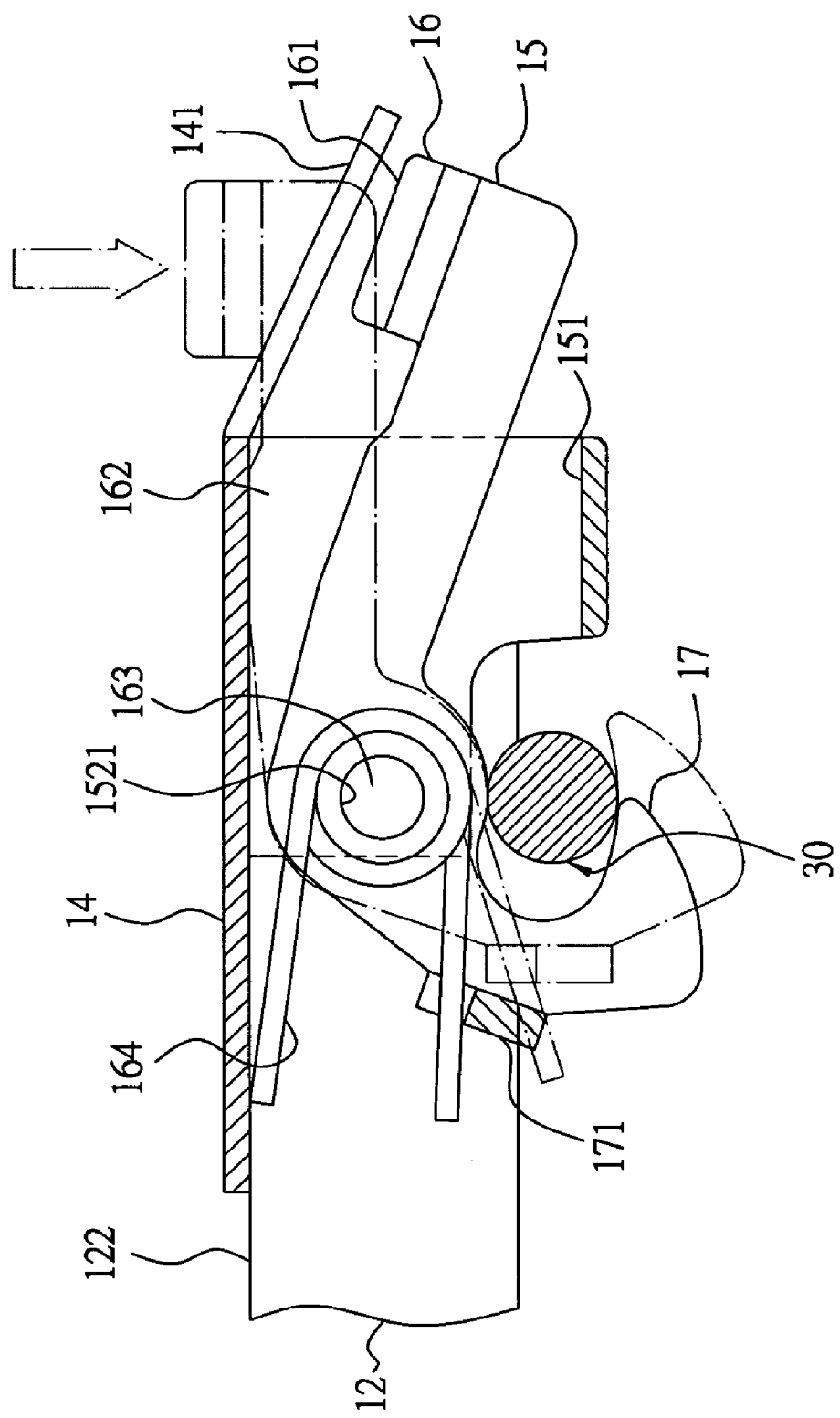
FIG. 8 is a side cross-sectional view of the movable bottom frame in the present invention, showing an unhooking condition of the locking hook and the locking rood.

To let the worktable 2 supported by its four support legs 3 again, as shown in FIG. 8, just pedal down the pedaling member 161 of the second pedal 16 and the locking hook 17, which is formed integral with the second pedal 16 and compressed by the torsion spring 164, will overcome the torsional resilience of the torsion spring 164 and will be pivotally turned open to disengage from the locking rod 30. Simultaneously, as described above, the weight of the worktable 2 will again imposed on the casters 13, 24 to make the pivotally connecting portions of the frame body 10 and the movable connecting rods 20 and the four support legs 3 of the worktable 2 turned synchronously to let the entire movable bottom frame 1 loosened and separated from the ground and the four support legs 3 stand on the ground anew to support the worktable 2. Evidently, the movable bottom frame 1 in the present invention can not only support the worktable 2 to stand on the ground stably, but also make it slide freely.

While the preferred embodiment of the invention has been described above, it will be recognized and understood that various modifications may be made therein and the appended claims are intended to cover all such modifications that may fall within the spirit and scope of the invention.

What is claimed is:

1. A movable bottom frame comprising:
a frame body having a plurality of level rods pivotally connected with one another, said rods having two rear free ends respectively and pivotally connected with the lower portions of two support legs of a workable, two casters respectively assembled under said rods near the two pivotal joints of said two support legs, said rods having two front free ends provided thereon with a first pedal, a locking hook provided under said first pedal and able to be pivotally turned elastically, said locking hook able to carry out clasping when said first pedal is pedaled down, a second pedal connected with the opposite end of the clasping portion of said locking hook, said locking hook turned pivotally to carry out unhooking when said second pedal is pedaled down;
two movable connecting rods having two rear free ends respectively and pivotally combined with the intermediate preset portions of said frame body, said two movable connecting rods having two front free ends respectively and pivotally connected with the lower portions of the other two support legs of said worktable, two casters respectively assembled under said two movable connecting rods near the two pivotal joints of said two support legs; and
a locking rod having opposing ends respectively assembled under said two movable connecting rods near the pivotal joints of said two support legs, said locking rod having its intermediate portion clasped by said locking hook under said first pedal when said first pedal is pedaled down and said frame body is pivotally moved downward, wherein said plural rods of said frame body consist of two side rods and two oblique rods, said two side rods having their rear free ends respectively and pivotally connected with two support legs of said worktable, said two side rods having the inner sides of their front free ends respectively secured with the rear free ends of said two oblique rods, said two oblique rods having their two front free ends extending inward obliquely.

2. The movable bottom frame as claim in claim 1, wherein said two oblique rods have said two front free ends combined thereon with said first pedal.

3. A movable bottom frame comprising:
a frame body having a plurality of level rods pivotally connected with one another, said rods having two rear free ends respectively and pivotally connected with the lower portions of two support legs of a workable, two casters respectively assembled under said rods near the two pivotal joints of said two support legs, said rods having two front free ends provided thereon with a first pedal, a locking hook provided under said first pedal and able to be pivotally turned elastically, said locking hook able to carry out clasping when said first pedal is pedaled down, said second pedal connected with the opposite end of the clasping portion of said locking hook, said locking hook turned pivotally to carry out unhooking when said second pedal is pedaled down;
two movable connecting rods having two rear free ends respectively and pivotally combined with the intermediate preset portions of said frame body, said two movable connecting rods having two front free ends respectively and pivotally connected with the lower portions of the other two support legs of said worktable, two casters respectively assembled under said two movable connecting rods near the two pivotal joints of said two support legs; and a locking rod having opposing ends respectively assembled under said two movable connecting rods near the pivotal joints of said two support legs, said locking rod having its intermediate portion clasped by said locking hook under said first pedal when said first pedal is pedaled down and said frame body is pivotally moved downward, wherein said two side rods are respectively and pivotally connected with said two movable connecting rods by two U-shaped connectors, which are respectively formed with two parallel side plates respectively having two sliding slots, with two pivots respectively inserted through said sliding slots and the opposite pivotal ends of said two side rods and said two movable connecting rods, said two side rods and said two movable connecting rods able to be pivotally turned by means of said two pivots sliding relatively in said two sliding slots.

* * * * *